United States Patent [19]

Jolivet et al.

[11] Patent Number: 5,703,148
[45] Date of Patent: Dec. 30, 1997

US005703148A

[54] ASPHALT-POLYMER COMPOSITIONS, PROCESS FOR MAKING SAME AND USES THEREOF

[75] Inventors: Yannick Jolivet, le Havre; Michel Malot, Bolbec; Didier Jamois, Sainte Adresse, all of France

[73] Assignee: Total Raffinage Distribution S.A., Puteaux, France

[21] Appl. No.: 414,124

[22] Filed: Mar. 16, 1995

Related U.S. Application Data

[63] Continuation-in-part of Ser. No. 303,222, Sep. 8, 1994, abandoned.

[30] Foreign Application Priority Data

Sep. 9, 1993 [FR] France .................. 93 10728
Jan. 25, 1995 [FR] France ................ 95 300830

[51] Int. Cl.$^6$ .................................... C08L 95/00
[52] U.S. Cl. .................... 524/62; 524/60; 524/68; 524/69; 524/70; 524/71; 524/484
[58] Field of Search .................. 524/59, 60, 62, 524/68, 69, 70, 71, 499, 489

[56] References Cited

U.S. PATENT DOCUMENTS

| | | | |
|---|---|---|---|
| 3,235,522 | 2/1966 | Carr | 524/499 |
| 3,422,053 | 1/1969 | Henderson et al. | 524/499 |
| 3,437,614 | 4/1969 | Young et al. | 524/499 |
| 3,763,074 | 10/1973 | Rostler | 524/60 |
| 3,779,964 | 12/1973 | Gagle et al. | 524/68 |
| 3,853,799 | 12/1974 | Behling et al. | 524/68 |
| 4,011,184 | 3/1977 | van Reijendam et al. | 525/98 |
| 4,038,096 | 7/1977 | Graf et al. | 524/474 |
| 4,068,023 | 1/1978 | Nielsen et al. | 524/62 |
| 4,105,612 | 8/1978 | Cushman et al. | 524/62 |
| 4,189,412 | 2/1980 | Klabunde | 524/62 |
| 4,203,881 | 5/1980 | Klezl | 524/62 |
| 4,278,469 | 7/1981 | Yan et al. | 524/71 |
| 4,459,157 | 7/1984 | Koons | 524/62 |
| 4,609,696 | 9/1986 | Wilkes | 524/62 |
| 4,629,754 | 12/1986 | Syrier et al. | 524/68 |
| 4,738,884 | 4/1988 | Algrim et al. | 524/68 |
| 4,992,492 | 2/1991 | Sainton | 524/62 |
| 5,068,270 | 11/1991 | Isobe et al. | 524/68 |
| 5,130,354 | 7/1992 | Gelles | 524/68 |
| 5,137,947 | 8/1992 | Isobe et al. | 524/68 |

FOREIGN PATENT DOCUMENTS

| | | | |
|---|---|---|---|
| 91 83018 | 2/1982 | Australia. | |
| 0 234 615 | 9/1987 | European Pat. Off.. | |
| 0 384 254 | 8/1990 | European Pat. Off.. | |
| 0 458 386 | 11/1991 | European Pat. Off.. | |
| 0 351 736 | 1/1992 | European Pat. Off.. | |
| 0 467 790 | 1/1992 | European Pat. Off.. | |
| 0 469 859 | 2/1992 | European Pat. Off. | 524/59 |
| 0 547 766 | 6/1993 | European Pat. Off.. | |
| 2 265 823 | 10/1975 | France. | |
| 58-0183759 | 10/1983 | Japan | 524/499 |
| 62-0030153 | 1/1987 | Japan | 524/62 |
| 4-0001258 | 1/1992 | Japan | 524/499 |
| 4-0359063 | 12/1992 | Japan | 524/499 |
| 0834049 | 5/1981 | U.S.S.R. | 524/62 |
| 1130140 | 10/1968 | United Kingdom. | |
| 2 015 536 | 9/1979 | United Kingdom. | |
| 2 074 147 | 10/1981 | United Kingdom. | |
| 90/10036 | 9/1990 | WIPO. | |
| 91/18032 | 11/1991 | WIPO. | |

*Primary Examiner*—Peter Szekely
*Attorney, Agent, or Firm*—Curtis, Morris & Safford, P.C.

[57] ABSTRACT

An asphalt-polymer composition containing:

a) at least 25 to 97 wt % of an asphalt, b) at least 1 to 25 wt % of a polymer, and c) at least 2 to 50 wt % of aromatic compound(s),
wherein
the aromatic compound(s) is present in an amount greater than 2 wt %, the at least one aromatic compound(s) and the polymer are present in amounts such that the ratio of amount present of aromatic compound to amount present of polymer is from 0.5 to 10, and the composition has a FRAASS point of less than or equal to −13° C. and a storage stability defined by a "Δ ring-and-ball" and a "Δ penetrability" of less than or equal to 5. Also a process for preparing such asphalt-polymer composition including mixing the asphalt, the polymer and the aromatic compound at a temperature from 190° to 300° C. for a period of time preferably exceeding 30 minutes. The asphalt-polymer composition can be used as a road asphalt, emulsion or surface coating.

27 Claims, No Drawings

ASPHALT-POLYMER COMPOSITIONS, PROCESS FOR MAKING SAME AND USES THEREOF

RELATED APPLICATIONS

This application claims priority from French Application No. 95.00830 filed Jan. 25, 1995 and is a continuation-in-part of U.S. application Ser. No. 08/303,222 filed Sep. 8, 1994, now abandoned, which latter in turn claims priority from French Application No. 93/10728, filed Sep. 9, 1993, each of which is hereby incorporated herein by reference. Reference is also made to commonly-owned copending U.S. applications: Ser. No. 08/367,096, filed Dec. 30, 1994, and allowed Serial Nos. 08/166,641 now U.S. Pat. No. 5,414,029 and Ser. No. 08/166,642 filed Dec. 14, 1993, now U.S. Pat. No. 5,423,085 each of which is also incorporated herein by reference.

FIELD OF THE INVENTION

The present invention relates to aromatic asphalt—polymer compositions, a process for making them and uses thereof. More particularly, the invention relates to storage-stable asphalt-polymer compositions. All documents referenced in the following discussion are hereby expressly incorporated herein by reference.

BACKGROUND OF THE INVENTION

Asphalt is a viscoelastic material. It has a tendency to harden and become brittle at low temperatures and; it softens and can flow at elevated temperatures. Its temperature sensitivity varies depending on its origin and production method.

In particular, asphalt can be obtained from crude petroleum as a distillation residue thereof and/or as a deasphalting pitch of the heavy fraction obtained by distillation(s). Depending on the origin of the crude petroleum, asphalt consists of varying proportions of paraffinic (aliphatic and naphthenic) and aromatic oils, resins and asphaltenes (on this subject, attention is directed to European Patent [EP] 246 956, and its U.S. equivalent, U.S. Pat. No. 4,810,367 both of which are owned by Applicants' assignee and are incorporated herein by reference).

The increase in stresses exerted on road coatings because of higher traffic density, higher vehicle acceleration and braking forces and the change in profile of heavy trucks that are now equipped with three or four rear axles, which prolongs the time of load application, makes it necessary to modify the bituminous or asphalt binders so as to increase their durability.

It is well known to modify asphalt to improve its durability by addition of a polymer. The polymer is added for the purpose of:

reducing the heat sensitivity of the asphalt by increasing or extending the plasticity range (by increasing the softening temperature and/or reducing the cold brittleness temperature), and increasing the resistance to deformation and the breaking point.

It has also been proven that the performance of a properly selected asphalt-polymer composition is superior to that of an asphalt not containing an added polymer. The problems of constituent compatibility encountered in attempts to attain the best compromise between the use performance and storage stability, however are difficult to overcome. For this reason, numerous patents claim compositions and/or processes for making such compositions that are said to provide solutions to such problems.

Thus, for instance, European Patent EP 458 386 relates to a process for obtaining an asphalt-polymer composition that is stable under conditions of fluidity prevailing during hot storage. The process consists of mixing at a temperature of 200° to 250° C. and for 45 min to 15 hours (depending on the temperature):

from 85 to 98 wt % of an asphalt selected from among asphalts having a penetrability from 30 to 220 tenths of a millimeter at 25° C., a softening point from 35° to 55° C. and a penetrability index from −1.5 to +1.5, and from 15 to 2 wt % of a sequenced styrene-butadiene-styrene copolymer (SBS) with a star or linear structure.

For reasons which will be given hereinbelow, the process described in EP-A-458 386, however, does not teach, suggest or provide in any systematic fashion, storage-stable, heat-resistant asphalt-polymer compositions. In fact, the use of 85 to 98 wt % of an asphalt selected from among asphalts having a penetrability from 30 to 220 tenths of a millimeter at 25° C., a softening point from 35° to 55° C. and a penetrability index from −1.5 to +1.5 does not ensure that a storage-stable asphalt-polymer composition will be obtained with certainty, from any asphalt.

OBJECTS AND SUMMARY OF THE INVENTION

Applicants have found, surprisingly, that a minimum amount of aromatic compounds in the asphalt-polymer composition and a particular ratio of the content of aromatic compounds to the polymer content confers to the composition good storage stability and good low-temperature characteristics.

An object of the present invention is therefore to obtain asphalt-polymer compositions which, as compared with an asphalt not containing added polymer, have improved physical properties and, in addition, are storage-stable.

To this end, an embodiment of the invention is an asphalt-polymer composition comprising:

a) at least 25 to less than 100 wt %, e.g., 25 to 97 wt % of an asphalt, such as 70 wt % or greater but less than 100 wt %, e.g., 70 to 97 wt %, b) greater than zero and up to 25 wt % polymer, preferably at least 1 to 25 wt % of a polymer, and c) at least 2 to 50 wt % of aromatic compounds (or at least one aromatic compound), such as at least 4 or 5 wt % of at least one aromatic compound.

The composition is characterized in that:

the aromatic compounds content is greater than 2 wt %, the ratio of the aromatic compounds content to the polymer content is from 0.5 to 10, and the composition has a FRAASS point equal to or lower than −13° C. and a storage stability as defined by "Δ ball-and-ring" and "Δ penetrability" equal to or less than 5.

As regards this embodiment of the invention and in the remainder of the present description, the penetrability is measured in accordance with AFNOR[1] method NFT 66004, the softening point in accordance with AFNOR method NFT 66008 (it is called "ring-and-ball" because of the method used), the penetrability index is determined by the [French] Highway Department method RLB1-1964, and the Fraass point, an indicator of the low-temperature fragility, is determined by AFNOR method T66 -026. The storage stability is determined by storing at 165° C. for 4 days a sample of the composition in a cylindrical container and determining the ring-and-ball temperature and the penetrability of the top and bottom layers of the sample.

[1] Association Francaise de Normalisation=French Association for Standardization. Each of AFNOR methods NFT 66004, 66008, and T-66 -026 and French Highways Department Method RLBI-1964 are incorporated herein by reference (as is EPA-458 386 and the abridgement thereto).

In this manner, it is possible to obtain the "delta" ring-and ball differences and the "delta" penetrability differences between the top and bottom layers. The lower the delta values (in the following text indicated by Δ), the more stable is the composition.

Preferably the composition of the invention contains aromatics having an aromatic content of 50 wt % or greater, preferably 80 wt % or greater. The aromatic compounds can have an initial distillation point above 200 °C., preferably above 300 ° C. The aromatic compounds can have a kinematic viscosity at 100 ° C. above 5 $mm^2$/s, preferably above 20 $mm^2$/s. The aromatic compounds can have a Cleveland Flash Point above 170 ° C., preferably above 200 ° C. The content of aromatic compounds in the composition can be greater than 4 wt %. The aromatic compounds can be selected from a cut from a non-hydrogenating petroleum conversion, a cut from dearomatization of lubricating bases or petroleum cuts, and mixtures thereof. The composition can have an aromatic compounds content to polymer content ratio of from 0.8 to 6.

The polymer is preferably a polymer containing hydrocarbon chains with mobile hydrogens, preferably natural or synthetic rubbers; for instance, styrene-butadiene or styrene-isoprene copolymers, e.g., SBR, sequenced styrene-butadiene copolymers (such as those with a linear or star structure, e.g., SBS), or, SIS.

The invention also provides processes for preparing the composition. In such processes, the polymer, aromatic compound and asphalt are mixed in the wt % specified above, at a temperature of 190 ° to 300 ° C., preferably 220 ° to 260 ° C., for a period of at least 30 minutes; for instance, up to about 1.5 to about 3.0 hours, e.g., up to about 1.5 to about 2 hours or up to about 1.75 or up to about 3 hours. For instance, an exemplified temperature is about 2 hours.

The mixing can be in any suitable order. For example, the aromatic compound can be added to an already-formed asphalt-polymer mixture, or, the aromatic compound can be added first to the asphalt or to the polymer, with the polymer or asphalt, respectively added thereafter. Alternatively, the aromatic compound can be added during the mixing step, e.g., each of the ingredients can be combined at the same time.

Further embodiments of the invention include road asphalt, surface covering or emulsion comprising a composition of the invention.

DETAILED DESCRIPTION

For purposes of the present invention, the asphalt used in the asphalt-polymer composition can be an asphalt referred to here as "natural" asphalt, to differentiate it from "synthetic" asphalt which will be described hereinbelow. Said natural asphalt is obtained, in particular, from crude petroleum, bituminous schists, heavy oils, bituminous sands or coal.

Natural asphalt can be, for example:

a) the heaviest fraction obtained by direct distillation of crude petroleum at atmospheric or reduced pressure;

b) the heavy phase obtained by solvent-deasphalting a heavy fraction as obtained under a);

c) the product of oxidation, in the presence or absence of a catalyst, of a heavy fraction as obtained under a) or of a heavy phase as obtained under b), d) the product of oxidation, in the presence or absence of a catalyst, of a blend of a heavy fraction as obtained under a) or of a heavy phase as obtained under b) and a distillate, or an aromatic extract obtained in the dearomatization of lubricating oils, or a deasphalting pitch, e) a blend of an oxidized product obtained as under c) and d) or of a hard phase, and a distillate, or an aromatic extract obtained in the dearomatization of lubricating oils, or a deasphalting pitch, or a heavy fraction as obtained under a) or a heavy phase as obtained under b);

f) a visbroken base, alone or in admixture with one or more of the above said products;

g) one of the products as obtained under a) to f) in admixture with a distillate, or an aromatic extract obtained in the dearomatization of lubricating oils, or a deasphalting pitch, or a heavy aromatic fraction (catalytic slurry) obtained from a catalytic cracking process.

Also suitable are synthetic asphalts with properties close to those of the "natural" asphalt described hereinabove, for example clear synthetic binders that can be colored by addition of pigments.

Such asphalts can consist, for example, of petroleum resins or indene-coumarone resins, blended with aromatic and/or paraffinic hydrocarbons.

Such petroleum resins can be prepared by polymerization of unsaturated hydrocarbons present in unsaturated petroleum fractions, such as the fractions obtained by thermal or steam cracking or by pyrolysis.

The indene-coumarone resins, on the other hand, are generally obtained from coal tars.

A polymer suitable for use in the composition according to the invention is, for example, a plastomer or a polymer having hydrocarbon chains with mobile hydrogens preferably, the polymer is selected from the group consisting of natural and synthetic rubbers. More preferably, the polymer is selected from copolymers of styrene and butadiene, for example, SBR (styrene-butadiene rubber), SBS (styrene-butadiene-styrene), Styrene and isoprene copolymers such as SIS (styrene-isoprene-styrene), and sequenced copolymers with a linear or star structure such as sequenced SBS with a linear or star structure.

From the standpoint of the make-up of the asphalt, namely its content of saturated hydrocarbons, aromatics, resins and asphaltenes, the asphalt is preferably chosen so as to have good compatibility with the polymer.

The asphalt-polymer composition according to the invention can contain up to 25 wt % of polymer, the polymer content being chosen as a function of the nature of the polymer, of the asphalt and of the properties desired for the intended use.

In the case of road applications (road asphalts, surface coatings, emulsions), the asphalt-polymer composition preferably contains from 2 to 7 wt % of polymer.

Below 2 wt % of polymer, the addition of polymer to asphalt is considered to have little effect on the properties of the composition;

Above 7 wt % of polymer, the polymer is too costly for road applications. Moreover, the composition increases in viscosity and can become incompatible with the material used for such applications. For industrial uses such as, for example, sealing coatings, however, the composition preferably contains more polymer, often more than 10 wt %, to attain, a high viscosity and high ring-and-ball temperature which thus confers high heat resistance to the composition.

The composition according to the invention can contain a styrene-butadiene copolymer, random or sequenced, but particularly a sequenced copolymer (SBS) with a linear or star structure. It can also contain a blend of different polymers (and/or of the same polymer) with different properties, for example different molecular weights.

Certain asphalts have an intrinsic aromaticity. For most uses, however, this aromaticity is usually insufficient to confer to the final composition the required storage stability and low-temperature resistance properties.

The aromatic compound that must be added according to the invention can stem from the following cuts, cut from non-hydrogenating conversion (particularly the cuts from catalytic cracking, thermal cracking, coking, visbreaking or pyrolysis), from the dearomatization of lubricating bases, from the dearomatization of petroleum cuts (for example, those containing furfural) or from a mixture of one or more of said cuts.

The aromatic compound is added in variable amounts depending on the nature and the origin of the asphalt used, but the asphalt-polymer composition most preferably contains more than 4 wt % of aromatic compounds.

The aromatic compound used are derived from aromatic petroleum cuts having an initial distillation point above 200° C., preferably above 300° C., and have any and more preferably most or all the following properties:

- a kinematic viscosity at 100 ° C. above 5 mm$^2$ /s and preferably above 20 mm$^2$ /s,
- A Cleveland Flash Point above 170 ° C., preferably above 200 ° C., and
- a content of constituents with aromatic rings greater than 50 wt % and preferably greater than 65 wt %.

The initial distillation point is measured by ASTM method D-1160, the kinematic viscosity according to ASTM method D-2170, the flash point according to AFNOR method EN 22592 and the content of aromatic rings by the "SARA" [saturates-aromatics-resins-asphaltenes] liquid-phase chromatographic method (HPLC) published by GSEE (Groupement Scientifique Européen de l'Etanchéité)[2] in CSTB[3] Notes No. 2555.

[2] European Scientific Group for Tightness.
[3] CSTB=Centre Scientifique et Technique du Batiment=Scientific and Technical Center for Buildings. ASTM D-1160, ASTM D-2170, AFNOR EN 22592, and CSTB Notes No. 2555 are hereby incorporated herein by reference.

On the other hand, Applicants have found that the higher the polymer content of the asphalt-polymer composition, the more aromaticity the composition must contain to be storage-stable and have good low-temperature resistance properties. Conversely, when the polymer content is lower, a small amount of aromaticity in the asphalt-polymer composition is sufficient to confer good properties to said composition.

Applicants consider that this proportionality between the content of aromatic compounds and the polymer content of the asphalt-polymer composition may be significant. Thus, according to the invention, the ratio of the content of aromatic compounds to the polymer content is from 0.5 to 10; the optimum ratio being from 0.8 and 6. The magnitude of this ratio varies depending on the origin of the crude petroleum from which the asphalt was obtained and on the type of aromatic compounds considered.

The processes for preparing the composition described hereinabove and the uses of the composition constitute additional embodiments of the invention.

The asphalt-polymer compositions are prepared by mixing the components at a temperature preferably from 190 ° to 300 ° C., more particularly from 220 ° to 260 ° C., for a period of, preferably, more than 30 minutes. The compositions are treated according to the process of the invention by adding an aromatic compound to the asphalt before adding the polymer and/or, for example, by adding to the asphalt the polymer in the form of a solution in the aromatic compound.

The asphalt-polymer composition treated according to the process of the invention combines good storage stability with good low-temperature resistance.

With regard to the asphalt, polymer and aromatic compounds and method of preparation of the inventive composition, reference is made to application Ser. No. 08/303,222.

The composition according to the invention can be used, in particular, with aggregates and fillers in road applications:

a) as is, for preparing road asphalts with good rutting resistance and excellent fatigue resistance;

b) as is or diluted with a hydrocarbon cut for preparing aqueous bituminous emulsions with excellent breaking characteristics and mechanical resistance;

c) diluted with a hydrocarbon cut for preparing water-free surface coatings with high mechanical performance.

The composition of the invention is thus a multi-functional binder. The composition according to the invention can be employed in the compositions and emulsions of copending, commonly owned applications Ser. Nos. 08/166, 641 and 08/166,642, now U.S. Pat. Nos. 5,414,029 and 5,428,085, respectively.

(124701 )

The invention may be illustrated by the following non-limiting examples, many apparent variations of which are possible without departing from the spirit of the invention.

EXAMPLE 1

This example concerns the preparation according to the invention of different compositions from a polymer P and different asphalts B and their comparison with state-of-the-art asphalt-polymer compositions.

1. Polymer P

This polymer is a styrene-butadiene-styrene copolymer (SBS) with a star structure and having the following properties:

styrene: butadiene weight ratio: 30 % weight-average molecular weight $M_w$: 300.000

2. Asphalt B

Five asphalts, $B_1$, $B_2$, $B_3$, $B_4$ and $B_5$, were used. Their properties are shown in Table I below.

TABLE I

| Asphalt | $B_1$ (2) | $B_2$ (2) | $B_3$ (2) | $B_4$ (2) | $B_5$ (2) |
|---|---|---|---|---|---|
| Ring-and ball temp., °C. | 46.2 | 55.2 | 50.9 | 51.0 | 65.5 |
| Penetrability in 1/10 of a mm at 25° C. | 86 | 42 | 61 | 63 | 16 |
| FRAASS point, °C.(1) | −15 | −9 | −11 | −12 | −3 |

1) The FRAASS point is an indicator of the low-temperature fragility and is determined by AFNOR method T66-026.
2) Asphalts $B_1$, $B_2$, $B_3$, $B_4$ and $B_5$ were obtained by mixing two asphalt bases BA and BB as shown in Table II below.

TABLE II

| Asphalt | BA, % | BB, % |
| --- | --- | --- |
| $B_1$ | 30 | 70 |
| $B_2$ | 60 | 40 |
| $B_3$ | 45 | 55 |
| $B_4$ | 40 | 50 |
| $B_5$ | 100 | 0 |

Base BA was a vacuum residue from a direct distillation (hard base) of a mixture of crudes containing 50 % of Maya crude and 50 % of Isthmus crude.

Base BB was a vacuum residue from a direct distillation (soft base) of a mixture of crudes containing 50 % of Maya crude and 50 % of Isthmus crude.

The properties of the asphalt bases are presented in Table III below.

TABLE III

| Asphalt Base | BA | BB |
| --- | --- | --- |
| Ring-and-ball temp., °C. | 65.5 | 40 |
| Penetrability in 1/10th of a mm, 25° C. | 16 | 182 |

3. Aromatic Asphalt-Polymer Composition

Varying amounts of asphalt $B_1$, $B_2$, $B_3$, $B_4$ or $B_5$ were mixed with polymer P, and an aromatic compound $A_1$ or $A_2$, both derived from the dearomatization of furfural-containing petroleum cuts, or $A_3$ derived from the slurry cut (namely the residue from the distillation of effluents from a catalytic cracking unit after separation of the HCO [high cycle oil] cut).

Compound $A_1$ had an initial distillation point of 430 ° C., a kinematic viscosity at 100 ° C. from 50 to 75 $mm^2$ /s, a Cleveland flash point of 230 ° C. or higher and a content of aromatic compounds of 81.4 wt %. These measurements were made in accordance with the standard methods defined in the description.

Compound $A_2$ had an initial distillation point of 400 ° C., a kinematic viscosity at 100 ° C. from 24 to 39 $mm^2$ /s, a Cleveland flash point of 220 ° C. or higher and a content of aromatic compounds of 82.2 wt %.

Compound $A_3$ had an initial distillation point of 350 ° C., a kinematic viscosity at 100 ° C. of about 17 $mm^2$ /s and a content of aromatic compounds of 68.1 wt %.

First, the asphalt was mixed with the aromatic compound and then polymer P was added at 250 ° C. over a period of 2 hours.

The compositions obtained, referred to as 1 to 7, are presented in Table IV below.

TABLE IV

| | Compositions | | | | | | |
| --- | --- | --- | --- | --- | --- | --- | --- |
| Constituents | 1 | 2 | 3 | 4 | 5 | 6 | 7 |
| % of $B_1$ | | | 95 | | | | |
| % of $B_2$ | | 85.5 | | | | | |
| % of $B_3$ | | | | 91.2 | | | |
| % of $B_4$ | | | | | 90.25 | | |
| % of $B_5$ | 100 | | | | | 71.25 | 46.55 |
| % of P | 0 | 5 | 5 | 5 | 5 | 5 | 5 |
| % of $A_1$ | 0 | 0 | 0 | 3.8 | 0 | 0 | 0 |
| % of $A_2$ | 0 | 9.5 | 0 | 0 | 4.75 | 0 | 0 |
| % of $A_3$ | 0 | 0 | 0 | 0 | 0 | 23.75 | 48.45 |

The properties of the compositions obtained are given in Table V below.

TABLE V

| | Compositions | | | | | | |
| --- | --- | --- | --- | --- | --- | --- | --- |
| Properties | 1 | 2 | 3 | 4 | 5 | 6 | 7 |
| Ring and ball temp., °C. | 65.5 | 83.8 | 93.0 | 77.9 | 78.8 | 86 | n.m. |
| Penetrability in 1/10th of a mm at 25° C. | 16 | 48 | 50 | 47 | 45 | 60 | n.m. |
| FRAASS point, °C. | −3 | −22 | −16 | −24 | −18 | −20 | n.m. |
| Storage stability (Δ ring-and-ball temp.) | 0 | 0 | 70 | 1 | 2 | 2 | 0 |
| Storage stability*) (Δ penetrability) | 0 | 1.3 | 38 | 0.1 | 0.1 | 0 | 0 |
| Storage-stable | yes | yes | no | yes | yes | yes | yes |
| Low-temperature-stable | no | yes | yes | yes | yes | yes | no | n.m. = not measurable

*)The storage stability was determined by storing at 165° C. for 4 days a sample of the composition in a cylindrical container and measuring the ring-and-ball temperature and penetrability of the top and bottom layers of the sample. The greater the difference between these values, the more stable is the composition.

Table V shows clearly that the compositions according to the invention, namely those with an aromatic content greater than and whose ratio of aromatic content to polymer content is from 0.5 to 10 , have at the same time a good FRAASS point and good storage stability.

EXAMPLE 2

This example concerns a variation on the method of preparation of the aromatic asphalt-polymer composition according to the invention.

In this example, the composition was obtained by preparing a polymer-aromatic compound stock solution which was then incorporated into the asphalt.

The selected polymer was polymer P of Example 1 , and the aromatic compound was compound $A_2$ of Example 1.

Table VI presents the properties of stock solutions $S_1$ and $S_2$ thus prepared.

TABLE VI

| Stock Solution | $S_1$ | $S_2$ |
| --- | --- | --- |
| % of P | 19 | 19 |
| % of $A_2$ | 81 | 81 |
| Mixing temperature, °C. | 200 | 180 |
| Mixing time, hrs | 1 | 3 |
| Quantity, kg | 0.8 | 3 |

The stock solutions were then mixed with asphalt $B_5$ of Example 1 under the mixing conditions defined in Table VII below.

TABLE VII

| Properties | Composition 1 | Composition 2 |
|---|---|---|
| % of $B_5$ | 74 | 74 |
| % of $S_1$ | 26 | |
| % of $S_2$ | | 26 |
| Mixing temp., °C. | 250 | 170 |
| Mixing time, hrs | 1 | 1.5 |
| Quantity, kg | 0.8 | 3 |

The properties of the compositions obtained are presented in the following Table VIII below.

TABLE VIII

| Properties | Composition 1 | Composition 2 |
|---|---|---|
| Ring-and-ball temp. °C. | 86 | 78 |
| Penetrability in 1/10th of a mm at 25° C. | 67 | 80 |
| FRAASS point, °C. | −21 | −20 |
| Storage stability* (Δ ring-and-ball temp.) | 2 | 41 |
| Storage stability* (Δ penetrability) | 2 | 55 |
| Storage-stable | yes | no |
| Low-temp.-stable | yes | yes |

*The storage stability was measured as in Example 1

Table VIII shows clearly that the aromatic asphalt-polymer compositions prepared under the conditions according to the invention and by incorporating into the asphalt a polymer dissolved in an aromatic compound have good low-temperature resistance and good storage stability.

Having thus described in detail preferred embodiments of the present invention, it is to be understood that the invention defined by the appended claims is not to be limited by particular details set forth in the above description as many apparent variations thereof are possible without departing from the spirit or scope of the present invention.

We claim:

1. Asphalt-polymer composition comprising:
   a) at least 25 to 97 wt % of an asphalt
   b) at least 1 to 25 wt % of a polymer
   c) at least 2 to 50 wt % of at least one aromatic compound derived from petroleum cuts having an initial distillation point above 200 ° C.,
   wherein
   the at least one aromatic compound and the polymer are present in amounts such that the ratio of amount present of aromatic compound to amount present of polymer is from 0.5 to 10,
   the composition has a FRAAS point of less than or equal to −13 ° C., and
   the composition has storage stability defined by a "Δ ring-and-ball" and a "Δ penetrability" of less than or equal to 5.

2. The composition according to claim 1, wherein the aromatic compound have a content of constituents with aromatic rings of at least 50 wt %.

3. The composition of claim 2 wherein the content of constituents with aromatic rings of the aromatic compound is at least 65 wt %.

4. The composition according to claim 1 wherein the aromatic compound has at least one of:
   a kinematic viscosity at 100 ° C. above 5 $mm^2$/s,
   a Cleveland Flash point above 170° C., and
   a content of constituents with aromatic rings of at least 50 wt %.

5. The composition according to claim 1 wherein the initial distillation point is above 300° C.

6. The composition according to claim 5 wherein the aromatic compound has a kinematic viscosity at 100 ° C. above 5 $mm^2$/s.

7. The composition according to claim 4 wherein the kinematic viscosity at 100° C. is above 20 $mm^2$/s.

8. The composition according to claim 1 wherein the aromatic compound has a Cleveland Flash Point above 170 ° C.

9. The composition according to claim 4 wherein the Cleveland Flash Point is above 200 ° C.

10. The composition according to claim 1 wherein the aromatic compound is present in an amount greater than 2 wt % and has:
    a kinetic viscosity at 100° C. above 5 $mm^2$/s,
    a Cleveland Flash Point above 170 ° C., and
    a content of constituents with aromatic rings of at least 50 wt %.

11. The composition according to claim 10 wherein the ratio of amount of aromatic compound present to amount of polymer present is from 0.8 to 6.

12. The composition of claim 11 wherein the aromatic compound is a cut from a non-hydrogenating petroleum conversion, a cut from dearomatization of lubricating bases or petroleum cuts, or mixtures thereof.

13. The composition according to claim 11 wherein the polymer has hydrocarbon chains with mobile hydrogens.

14. The composition of claim 13 wherein the polymer is selected from the group consisting of natural and synthetic rubbers.

15. The composition of claim 14 wherein the polymer is a styrene-butadiene or styrene-isoprene copolymer.

16. The composition according to claim 15 wherein the polymer is a linear or sequenced styrene-butadiene-styrene copolymer.

17. The composition according to claim 16 wherein the asphalt is a "natural" asphalt.

18. The composition according to claim 16 wherein the asphalt is a "synthetic" asphalt.

19. A process for preparing a composition according to claim 1 comprising mixing the asphalt, the polymer and the aromatic compound at a temperature from 190 ° to 300 ° C.

20. The process of claim 19 wherein the mixing is at 220° C. to 260° C.

21. The process according to claim 19, wherein the mixing comprises: (i) preparing an asphalt-polymer mixture and mixing the aromatic compound with the asphalt-polymer mixture; or (ii) preparing a mixture comprising the aromatic compound and the asphalt and mixing the polymer with the mixture comprising the aromatic compound and the asphalt; or (iii) preparing a mixture comprising the aromatic compound and the polymer and mixing the asphalt with the mixture comprising the aromatic compound and the polymer; or (iv) the aromatic compound, the asphalt and the polymer are admixed.

22. A road asphalt comprising the composition of claim 1.

23. A road surface coating comprising the composition of claim 1.

24. An emulsion comprising the composition of claim 1.

25. The composition of claim 1 wherein the aromatic compound is present in an amount greater than 2 wt %.

26. The composition of claim 10 wherein the aromatic compound is present in an amount greater 4 wt %.

27. The process of claim 19 wherein the mixing is for a period of time exceeding 30 minutes.

* * * * *

UNITED STATES PATENT AND TRADEMARK OFFICE
CERTIFICATE OF CORRECTION

PATENT NO. : 5,703,148
DATED : December 30, 1997
INVENTOR(S) : Jolivet, Yannick (et al)

It is certified that error appears in the above-identified patent and that said Letters Patent is hereby corrected as shown below:

In column 1 of the title page under the heading Item
"[30] Foreign Application Priority Data" replace "95 300830"
by --95 00830--.

Signed and Sealed this

Twenty-first Day of April, 1998

Attest:

BRUCE LEHMAN

Attesting Officer     Commissioner of Patents and Trademarks